Oct. 25, 1932.                S. SAK                1,884,272
              METHOD OF CONTROLLING YEAST PROPAGATION
                      Filed Aug. 29, 1927
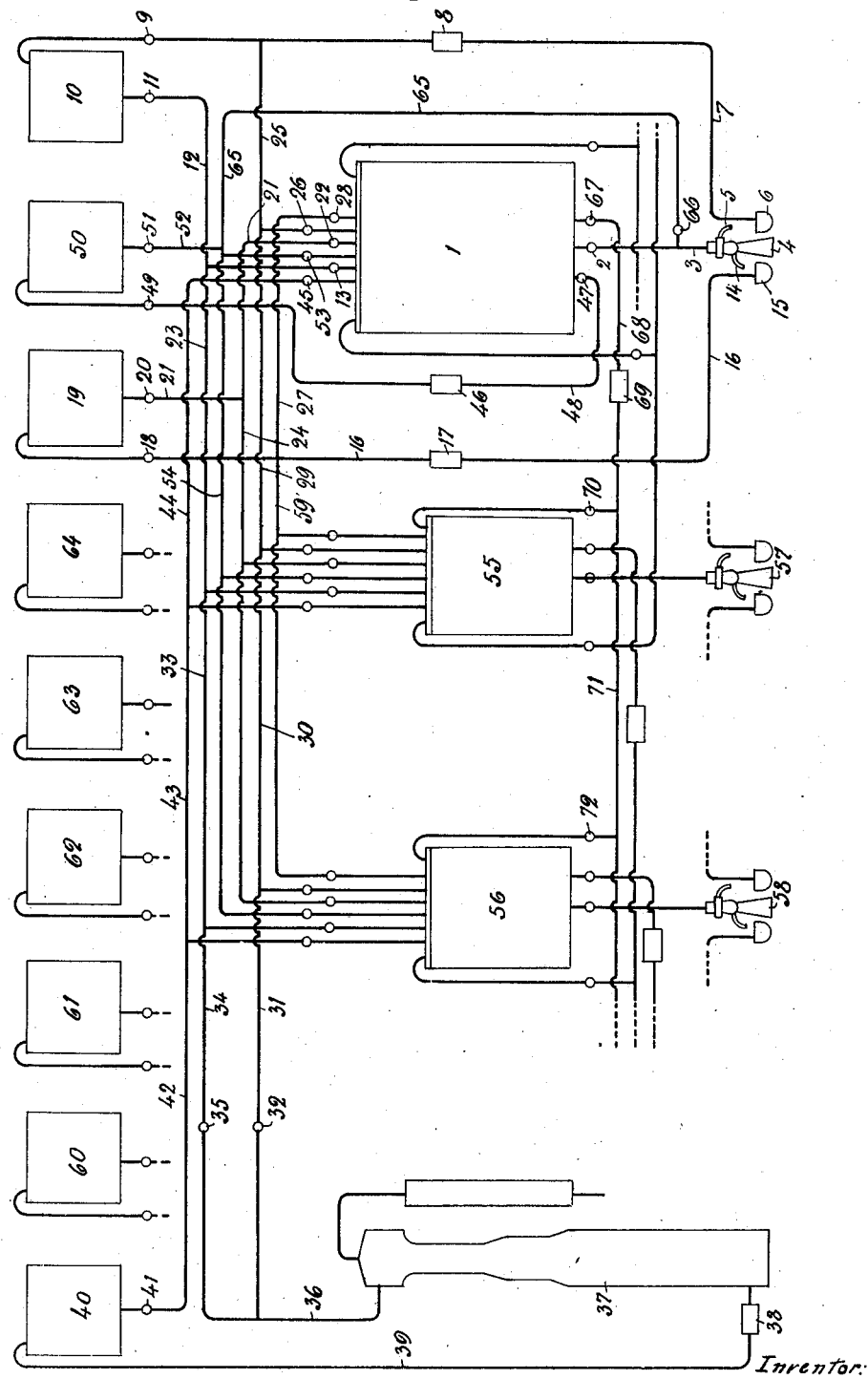
Inventor:
Søren Sak,
By Langner, Parry, Card & Langner
Attys Patented Oct. 25, 1932

1,884,272

UNITED STATES PATENT OFFICE

SØREN SAK, OF CHARLOTTENLUND, DENMARK

METHOD OF CONTROLLING YEAST PROPAGATION

Application filed August 29, 1927, Serial No. 216,248, and in Norway January 8, 1927.

The present invention relates to a method of producing compressed yeast, especially air-grown yeast, with or without the production of alcohol.

The process is applicable both to the production of compressed yeast and to the production of the seed yeast used in the manufacture of compressed yeast.

The novel process consists principally in controlling systematically the weight of yeast per unit volume of propagating wort in air-grown yeast manufacture and is carried out after propagation has begun by withdrawing from the wort in the propagation vat, yeast-containing wort, and thereafter returning to the vat part or all of yeast in any form originating from the said withdrawn wort, yeast not originating from the said withdrawn wort, yeast nutrient solution, for instance fresh wort, water or a combination of these being simultaneously added to the said propagating vat.

The term "yeast in any form" also includes yeast-containing wort, it being sometimes desirable to dispense with the centrifuging of the withdrawn yeast-containing wort and to use this same wort in the same manner as described below with regard to centrifuged yeast.

The novel process may also be carried out in the manner that the control of the weight of yeast per unit volume of propagating wort under withdrawal of yeast-containing wort is effected by controlled addition of yeast nutrient solution to the propagating wort, thus without returning or addition of yeast.

Furthermore, the novel process can be carried out by propagating yeast in a propagating wort in more than one vat, withdrawing yeast-containing wort from one of the said vats, transferring at least part of yeast in any form originating from the said withdrawn wort to the propagating wort in another vat, withdrawing yeast-containing wort from this vat, and transferring at least part of yeast in any form originating from the last-named withdrawn wort to the propagating wort in a following vat, if any, and so on, returning at least part of the yeast in any form originating from the last vat, to which yeast has been transferred, to the initial vat, which circulation can be continued.

Finally, the novel process can be carried out by propagating yeast in a propagating wort simultaneously in more than one vat, withdrawing yeast-containing wort from one of the said vats, transferring at least part of yeast in any form originating from the said withdrawn wort to the propagating wort in another vat, withdrawing yeast-containing wort from this vat and transferring at least part of yeast in any form originating from the last-named withdrawn wort to the propagating wort in a following vat, if any, withdrawing yeast-containing wort therefrom and so on.

The process also includes augmenting an increase or a decrease or reducing an increase or a decrease of the weight of yeast per unit volume of propagating wort by augmenting, that is, reducing the velocity with which the yeast-containing wort is withdrawn, the volume of yeast nutrient solution added being kept substantially constant.

The novel process belongs to the general methods of producing compressed yeast in which yeast-containing wort is withdrawn, that is to say, the so-called continuous withdrawal processes; in addition fresh wort or other solutions of nutrients, solutions of chemicals, centrifuged wort or water may be added simultaneously to the propagating wort, and the novel process thus also belongs to the wider class of continuous withdrawal and continuous addition processes. It has in common with these processes that yeast-containing wort is withdrawn and that as a rule there is a simultaneous addition of nutrients, such as fresh wort or other solutions or chemicals or water.

The weight of yeast per unit volume of wort is of vital importance to the progress of a propagation process, and is particularly of importance to the processes using continuous withdrawal and continuous addition in which yeast-containing wort is withdrawn and fresh wort simultaneously added.

With a certain weight of yeast per unit volume of wort—a given velocity of addition of fresh wort and a given velocity of withdrawal of yeast-containing wort being presumed—the wort withdrawn will be incompletely fermented, and it will then as a rule contain alcohol. With a certain greater weight of yeast per unit volume of wort the withdrawn wort is completely fermented and contains alcohol; by further increasing the weight of yeast per unit volume of wort, alcohol will either not be formed in aerated suitably diluted wort, or it will only be formed in such small quantities that it will disappear more or less completely during the propagation.

By varying the weight of yeast per unit volume of wort in at least one of the vats belonging to the system the wort may be completely or incompletely fermented, and the withdrawn wort may contain alcohol or be free from, or practically free from, alcohol.

The propagation generally occurs in solutions (wort, mash) of concentrations such as are commonly used in the production of airgrown yeast, and the withdrawn yeast containing wort may be separated in known manner into yeast and substantially yeast-free wort, generally by centrifuging and subsequent pressing. The centrifuging is conducted in such a manner, that the yeast as far as possible, in some cases by washing and repeated centrifuging, is separated from adherent wort.

For the production of wort used for propagation, the raw materials in general, well known in the manufacture of compressed yeast, are used or mixtures of such raw materials, and it is likewise possible, during propagations according to the novel method, to add to the wort the usual, well known auxiliary substances, such as phosphates and other salts, especially ammonium salts, potassium and magnesium salts and similar chemicals, as well as ammonia and sulphuric acid.

In the course of the propagating and the manufacture, besides propagating and fermented wort, centrifuged wort is produced. as also in some cases wort, which is fully or partly divested of alcohol by distillation; in order to utilize the nutrients contained in the alcohol-containing wort produced by such propagations, part of or the whole quantity of the contrifuged wort is wholly or partly divested of alcohol by distillation, in some cases under reduced pressure, whereafter the wort thus produced, either free from alcohol or poorer in alcohol, may be wholly or partly, continuously or intermittently, during part of the propagation or during the whole propagation, returned to the propagating wort from which the corresponding alcohol-containing wort originates or to one or more vats containing propagating wort.

The system comprises, besides various propagation vats, various storage vats (reservoirs) for wort of different concentrations, liquid yeast, also called "yeast cream", i. e. the yeast produced by centrifuging and having adherent wort, propagating wort, fermented wort, centrifuged wort, residual wort, molasses, chemicals or the like, and in addition the usual storage vat or vats for water.

One example of the use of the method is as follows:

A propagation is started in about 20,000 litres of a solution of molasses of 1.8° Balling and at a temperature of about 30° C. by sowing under aeration of 600 kilos of seed-yeast. An hour after the seed-yeast has been sown 22,000 litres of a solution of molasses of 1.5° Balling are added, the velocity of addition being about 11,000 litres per hour. When, from analytical investigations of the filtrate from the propagating wort it appears that the sugar has been practically all consumed about 180 litres of propagating wort are withdrawn per minute and by means of centrifugal machines separated into centrifuged wort and centrifuged yeast, the latter being returned to the propagation vat, whereafter about 180 litres of a solution of molasses of 1.5° Balling are added per minute. During the propagation chemicals are added as usual.

As the amount of yeast in the propagation vat increases, the velocity of addition of fresh wort and withdrawal of yeast-containing wort is increased until a sample withdrawn shows but slight sugar content. Then the weight of yeast per unit volume of wort is augmented by an increased return to the propagation vat of centrifuged yeast, until a sample withdrawn shows that the sugar has been practically all consumed. The weight of yeast per unit volume of propagating wort is then ascertained in a sample withdrawn and the return of centrifuged yeast is controlled in such a manner, that the weight of yeast per unit volume of propagating wort is maintained constant or practically constant at the value stated.

It is also possible to establish a certain weight of yeast per unit volume of wort, for instance, 0.040 Kilos per litre and control the velocity of addition of fresh wort and withdrawal of yeast-containing wort until a point of balance has been obtained, whereafter the return of centrifuged yeast may be controlled in such a manner that the said weight of yeast per unit volume of wort is kept constant or practically constant for a short or long time.

Similar tests may be made from time to time during the propagation. During the propagation phosphates, ammonium compounds and other salts are added as usual. The temperature is kept at 30° C.

The intensity of aeration during the first hour is about 200 cubic meters, during the second hour about 2400 cubic meters and during the following hours about 4500 cubic meters of air per hour.

When consistently carried out this principle can be used for the permanent manufacture of air-grown yeast, that is to say, the propagations can be carried on for several days and nights in succession without any substantial interruptions.

At each propagation, in the carrying through of which the yield of yeast, plays a vital part, it is of importance that a high percentage of the cells be in germinating condition and the said manipulations for controlling the weight of yeast per unit volume of wort, therefore, are of great importance to the obtaining of such weight of yeast per unit volume of wort in a wort of suitable concentration and temperature and aerated in a suitable manner so as to cause a high percentage of cells, for instance 50-70 per cent or more, to germinate. With a little practice the percentage of germinating cells can easily be ascertained microscopically, and the weight of yeast per unit volume of wort at any time can, for the rest, easily be ascertained by examination of a withdrawn sample.

The presence of a very great weight of yeast per unit volume of propagating wort causes germination of only a small percentage of cells; the presence of a smaller weight of yeast per unit volume of propagating wort causes germination of a greater percentage of cells. By varying the weight of yeast per unit volume of propagating wort in one or more of the vats it is thus possible to cause germination of a greater or smaller part of the cells in the vat or vats in question.

At a given temperature and intensity of aeration, and with a certain velocity of addition of yeast and/or yeast nutrient solution and the same velocity of withdrawal of the yeast-containing wort, the weight of yeast per unit volume of wort is conclusive of whether the yeast-containing wort when being withdrawn is completely fermented, i. e. the nutrients consumed, or practically consumed. To ascertain whether this is the case demands a little more trouble than ascertaining microscopically the percentage of germinating cells; but with a little practice it can easily be ascertained whether more than a slight vestige be left of the most important nutrients, such as sugar, ammonia, decomposed protein substance, or the like.

If more than a slight vestige is left the velocity of adding the yeast nutrient solution is reduced to a suitable degree, whereafter yeast in any form originating from the propagating wort or elsewhere is added until the weight of yeast per unit volume of wort produced again allows the yeast nutrient solution to be again added at a normal rate.

During the propagation the withdrawal of yeast-containing wort in connection with addition of solutions of nutrients in one form or another involves a decrease of weight of yeast per unit volume of wort.

The increase of the amount of yeast which is involved by the propagation is a factor which has the opposite effect but does not, or at least not always, eliminate the said decrease of weight of yeast per unit volume of wort.

In cases in which the increase of weight involved by the propagation does not eliminate the decrease involved by the factors named, the actual quantities of yeast in the propagation vat are supplemented by addition of fresh yeast in any form in such quantities that a practically constant or if desired an increasing weight of yeast per unit volume of wort is established during the propagation for a short or long period of time.

Addition of fresh nutrient and simultaneous withdrawal of yeast-containing wort may also be controlled in such a manner that a predetermined weight of yeast per unit volume of wort is established during the propagation.

A constant or nearly constant weight of yeast per unit volume of wort can thus be maintained during part of the propagation or during the whole of the propagation; likewise during part of the propagation or the whole of the propagation the weight of yeast per unit volume of wort can be caused to increase either gradually or abruptly from a present weight of yeast per unit volume of wort to any desired weight of yeast per unit volume of wort; further during part of the propagation or during the whole of the propagation the weight of yeast per unit volume of wort can be caused to decrease either gradually or abruptly from a present weight of yeast per unit volume of wort to a desired weight of yeast per unit volume of wort.

One portion of the process hitherto described can be summarized as follows: In the process of producing in one or more vats yeast, principally compressed yeast, and especially air-grown yeast, with or without the production of alcohol, wherein yeast-containing wort is withdrawn during the propagation and there is added to the propagating wort, if desired, fresh wort or other nutrient solutions, solutions of chemicals, centrifuged wort or water, it is desired to establish during the propagation for a short or long period a certain weight of yeast per unit volume of wort by controlled return to the propagating wort of part of or the whole amount of yeast in any form originating from the said withdrawn yeast-containing wort.

The weight of yeast per unit volume of wort thereby established can be such that the yeast-containing wort withdrawn, is practically completely fermented, i. e. the nutrients practically consumerd; or such that the yeast containing wort, withdrawn, contains alcohol or is free or practically free from alcohol; and during a shorter or longer part of the propagation the weight of yeast per unit volume of wort may be maintained constant or practically constant, or it may be allowed either to increase, either gradually or abruptly, from a present amount to a desired amount, or it may be allowed to decrease either gradually or abruptly from a present amount to a desired amount.

Therefore, fresh yeast developed outside the system may be added to the propagating wort or to the storage vat for centrifuged yeast, and this yeast may be added in the form of centrifuged yeast, yeast cream, compressed yeast, or as yeast in any other form.

The above described propagation can, as said, be carried on in such a manner that alcohol is produced and can be developed, even if it is often produced in low concentrations (about ½ per cent or less), or it can be carried on in such a manner that alcohol is formed in such small quantities that it can hardly be traced, or the propagation can be carried on in such a manner, that the alcohol produced during a subsequent part of the propagation is again caused to disappear.

It is well known that intense aeration increases the yield of yeast at the expense of the yield of alcohol, and this also applies to the present method.

Further, the velocity of the addition of the yeast nutrient solution is of importance; the velocity ought not to be greater than that the wort is fermented when leaving the propagation vat.

It will thus be seen that a controlled withdrawal of the yeast containing wort and a controlled returning of yeast in any form originating from the said withdrawn yeast-containing wort to the propagating wort present measures by means of which the propagation can be controlled so that alcohol as by-product is produced or not produced as desired.

The system described consisting of the propagation vat or vats, storage vats, centrifugal machines and returning devices for the yeast to the propagation vat as also arrangements for transferring yeast to the subsequent vat or vats, can be utilized for continuous manufacture of air-grown yeast in the sense that the propagation can be continued uninterruptedly (without emptying the vats) for several days and nights, which is an advantage with a view to the production. In the practical carrying out of such continuous production of air-grown yeast, various circumstances must be taken into consideration.

It is obvious that in such permanent production it is necessary to take the most thorough measures with regard to cleaning, and therefore it might be necessary to put out of activity for some hours propagation vats in order to submit them to the necessary cleaning, on which occasion it may be necessary to have spare vats at disposal. Such interruptions, however, can be limited to such an extent that the term "continuous production" is not divested of its justification on that account.

The diagrammatic view shown in the present drawing serves as an illustration of the method described above and of the apparatus necessary for the carrying out of the method with appurtenant pipings, pumps and centrifugal machines; presses and aeration devices, however, being left out for sake of clearness, as also centrifugal machines, pipings and pumps for transition of centrifuged wort and yeast cream and pipings and pumps for transition of propagation wort to storage vats are only shown in connection with one of the propagation vats for sake of a general view, the arrangement as regards the other propagation vats being exactly similar. Further, it must be observed, that the system may comprise more propagation vats than shown in the drawing.

During part of the propagation or during the whole propagation it is desired to establish in the propagation vat 1 a certain weight of yeast per unit volume of wort, through controlled withdrawal of yeast-containing wort, which through the valve 2 and the pipe 3 is led to the centrifugal machine 4, where it is separated into centrifuged wort, which through the discharge-pipe 5 is discharged into the container 6, and into yeast cream, which through the discharge-pipe 14 is discharged into the container 15.

From the container 6 the wort is by means of the pump 8 led through the pipe 7, either through the valve 9 to the storage vat 10 for centrifuged wort or through the pipe 25 and the valve 26 back to the initial vat 1 or further through the pipe 29 to the other propagation vats 55 and 56. From the storage vat 10 the centrifuged wort is led through the valve 11 either through the pipe 12 and the valve 13 back to the initial vat 1 or through the pipes 12, 23 to the other propagation vats 55 and 56. From the container 15 the yeast cream is by means of the pump 17 led through the pipe 16 either through the valve 18 to the storage vat 19 for yeast cream or through the pipe 27 and the valve 28 back to the initial vat 1. From the storage vat 19 the yeast cream is led through the valve 20, the pipe 21 and the valve 22 back to the initial vat 1 or through the pipes 21, 24 to the other propagation vats 55 and 56.

Part of or the whole quantity of yeast cream gained from part of or the whole quantity of propagating or fermented wort withdrawn for instance from the propagation vat 1 during or after the propagation, is led during part of the propagation or during the whole propagation by means of the pump 17 through the pipes 16, 59 to the various propagation vats 55, 56, in which is found propagating or non-propagating wort, in order to, after the cells in these vats having displayed a more or less intense activity of growth, and after propagating or fermented wort from these vats by means of the centrifugal machines 57 and 58, respectively, having been separated into yeast and wort in the form of yeast as far as possible divested of adherent wort, be continuously or intermittently returned to the initial vat 1 during part of the propagation or during the whole propagation which circulation can be continued.

Part of or the whole quantity of centrifuged wort can by distillation, in some cases in vacuum, be fully or partly divested of its contents of alcohol, it being led to the column-apparatus 37 either from the pipe 7 through the pipes 25, 29, 30, 31, 36 and the valve 32, or from the storage vat 10 through the valve 11, the pipes 12, 23, 33, 34, 36 and the valve 35. By means of the pump 38 the wort which is fully or partly divested of its contents of alcohol is led through the pipe 39 to the storage vat 40, from which the alcohol-free or alcohol-poorer wort can be continuously or intermittently led to one or more of the other propagation vats, for instance, to the propagation vat 1 through the valve 41, the pipes 42, 43, 44 and the valve 45.

The yeast containing wort can from the propagation vat 1 by means of the pump 46, be led to the storage vat 50 through the valve 47, the pipe 48 and the valve 49. From the storage vat 50 yeast containing wort can be returned to the propagation vat 1 through the valve 51, the pipe 52 and the valve 53, or to the other propagation vats through the pipe 54, or to the centrifugal machine 4 through the pipe 65 and the valve 66. The yeast-containing wort can also from the propagation vat 1 by means of the pump 69 through the valve 67, the pipe 68 and the valve 70, be led to the propagation vat 55 or further through the pipe 71 and the valve 72 to the propagation vat 56.

The storage vats 60 and 61 serve for gathering of fresh wort and molasses, whereas the storage vats 62 and 63, 64 and other containers, which are not shown in the drawing, serve for gathering of ammonium sulphate, ammonia water and other chemicals.

Having thus fully described my invention I claim as new and desire to secure by Letters Patent:

1. In a continuous-addition-continuous-withdrawal process of manufacturing yeast in which yeast is propagated in a vat with propagating wort, the improvement comprising, besides the well known means, maintaining constant the weight of yeast per unit volume of propagating wort during a substantial part of the propagation, for controlling the run of the process, by adding yeast in any form in sufficient amount to supply any deficiency.

2. In a continuous-addition-continuous-withdrawal process of manufacturing yeast in which yeast is propagated in a vat with propagating wort, the improvement comprising withdrawing yeast-containing wort from the said propagating wort and making during the propagation regulated addition to the said propagating wort of yeast in any form originating from the said withdrawn wort and regulated addition of yeast nutrient solutions in such quantities and in such a concentration that a constant quantity by weight of yeast per unit volume of propagating wort is maintained during at least part of the propagation.

3. In a continuous-addition-continuous-withdrawal process of manufacturing yeast in which yeast is propagated in a vat with propagating wort, the improvement comprising withdrawing yeast-containing wort from the said propagating wort and making during the propagation regulated addition to the said propagating wort of yeast in any form originating from the said withdrawn wort and regulated addition of yeast nutrient solutions in such quantities and in such a concentration that the quantity by weight of yeast per unit volume of propagating wort is altered.

4. In a continuous-addition-continuous-withdrawal process of manufacturing yeast in which yeast is propagated in a vat with propagating wort, the improvement comprising making during the propagation regulated addition to the said propagating wort of extraneous yeast and yeast nutrient solutions in such quantities and in such a concentration that a constant quantity by weight of yeast per unit volume of propagating wort is maintained during at least part of the propagation.

5. In a continuous-addition-continuous-withdrawl process of manufacturing yeast in which yeast is propagated in a vat with propagating wort, the improvement comprising making during the propagation regulated addition to the said propagating wort of extraneous yeast and yeast nutrient solutions in such quantities and in such a concentration that the quantity by weight of yeast per unit volume of propagating wort is altered.

6. In a continuous-addition-continuous-withdrawal process of manufacturing yeast in which yeast is propagated in a vat with propagating wort, the improvement comprising making during the propagation regulated addition to the said propagating wort of yeast nutrient solutions in such quantities and in such a concentration that a constant quantity by weight of yeast per unit volume of propagating wort is maintained during at least part of the propagation.

7. In a continuous-addition-continuous-withdrawal process of manufacturing yeast in which yeast is propagated in a vat with propagating wort, the improvement comprising making regulated addition during the propagation to the said propagating wort of yeast nutrient solutions in such quantities and in such a concentration that the quantity by weight of yeast per unit volume of propagating wort is altered.

8. In a continuous-addition-continuous-withdrawal process of manufacturing yeast in which yeast is propagated in a vat with propagating wort, the improvement comprising withdrawing yeast-containing wort from the said propagating wort and during the propagation returning directly to the said propagating wort, yeast in any form originating from the said withdrawn wort.

9. In a continuous-addition-continuous-withdrawal process of manufacturing yeast in which yeast is propagated in a vat with propagating wort, the improvment comprising withdrawing yeast-containing wort from the said propagating wort and during the propagation returning to the said propagating wort, yeast in any form originating from the said withdrawn wort which yeast thereby is passed through at least one other vat with propagating wort.

10. In a continuous-addition-continuous-withdrawal process of manufacturing yeast in which yeast is propagated in a vat with propagating wort, the improvement comprising withdrawing yeast containing wort from the said propagating wort and during the propagation returning directly to the said propagating wort, yeast in any form originating from the said withdrawn wort, this returning occurring later than the withdrawing.

11. In a continuous-addition-continuous-withdrawal process of manufacturing yeast in which yeast is propagated in more than one vat with propagating wort the improvement comprising withdrawing yeast-containing wort from a propagating wort in one vat and during the propagation returning to the propagating wort in this vat yeast in any form originating from the said withdrawn wort which yeast thereby is passed through at least one other vat with propagating wort.

12. In a continuous-addition-continuous-withdrawal process of manufacturing yeast in which yeast is propagated in a propagating wort, the improvement which comprises withdrawing yeast-containing wort from the propagating wort and making regulated addition to the said propagating wort of yeast in any form originating from the said withdrawn wort, continuously during at least part of the propagation.

In testimony whereof I have affixed my signature.

SØREN SAK.